United States Patent
Kim et al.

(10) Patent No.: US 9,369,316 B2
(45) Date of Patent: Jun. 14, 2016

(54) DIGITAL DEMODULATION METHOD AND SYSTEM

(71) Applicant: Electronics and Telecommunications Research Institute, Daejeon (KR)

(72) Inventors: Young Min Kim, Daejeon (KR); Jae Hyun Seo, Daejeon (KR); Heung Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/618,058

(22) Filed: Feb. 10, 2015

(65) Prior Publication Data

US 2015/0244550 A1 Aug. 27, 2015

(30) Foreign Application Priority Data

Feb. 25, 2014 (KR) .................. 10-2014-0022106

(51) Int. Cl.
*H04L 27/06* (2006.01)
*H04L 25/06* (2006.01)
*H04L 27/20* (2006.01)
*H04L 27/38* (2006.01)

(52) U.S. Cl.
CPC .......... *H04L 25/067* (2013.01); *H04L 27/2032* (2013.01); *H04L 27/38* (2013.01)

(58) Field of Classification Search
CPC ... H04L 25/067; H04L 27/2601; H04L 1/006; H04L 27/2649; H04L 1/0055; H04L 1/203; H04L 25/03197; H04L 25/06; H04L 27/14; H04L 27/2032; H04L 27/38; H03M 13/256; H03M 13/2957; H03M 13/41; H03M 13/6325; H03M 13/1111; H03M 13/25; H03M 13/3905; H03M 13/112; H03M 13/39; H03M 13/3961
USPC ......... 375/341, 340, 298, 260, 262, 316, 286, 375/264; 714/780, 795, 794, 796
See application file for complete search history.

(56) References Cited

U.S. PATENT DOCUMENTS 7,480,342 B2 * 1/2009 Wilhelmsson ........ H04L 25/067 375/262
2011/0044407 A1 2/2011 Chang et al.

FOREIGN PATENT DOCUMENTS

KR 1020110019691 A 2/2011

* cited by examiner

*Primary Examiner* — Rahel Guarino
(74) *Attorney, Agent, or Firm* — William Park & Associates Ltd.

(57) ABSTRACT

A digital demodulation system calculates an I channel value and a Q channel value of a received signal. The digital demodulation system then changes detection levels to obtain non-uniform detection levels. The digital demodulation system then demodulates the received signal bit by bit by using the changed detection levels and the I channel value and the Q channel value.

4 Claims, 6 Drawing Sheets

DIGITAL DEMODULATION METHOD AND SYSTEM

CROSS-REFERENCE TO RELATED APPLICATION

This application claims priority to and the benefit of Korean Patent Application No. 10-2014-0022106 filed in the Korean Intellectual Property Office on Feb. 25, 2014, the entire contents of which are incorporated herein by reference.

BACKGROUND OF THE INVENTION (a) Field of the Invention

The present invention relates to a digital demodulation method and system, and more particularly, to a technique of improving reception performance by changing detection levels at a receiver in a communication system using a digital demodulation scheme.

(b) Description of the Related Art

In a communication system using a conventional digital modulation scheme, reception performance can be improved by changing detection levels at a receiver.

There are many standards that are expected to adopt non-uniform constellation transmission technology in the future to improve system performance. Some standards have already adopted this technology. Due to changes in constellations made at a transmitter, the non-uniform constellation transmission technology can achieve performance improvement only by changing detection levels at a receiver.

SUMMARY OF THE INVENTION

The present invention has been made in an effort to provide a digital demodulation method and system which are backward-compatible and have non-uniform detection levels.

An exemplary embodiment of the present invention provides a digital demodulation method for a digital demodulation system that demodulates a received signal, the method including: calculating an I channel value and a Q channel value of a received signal; changing detection levels to obtain non-uniform detection levels; and demodulating the received signal bit by bit by using the changed detection levels, the I channel value, and the Q channel value.

In the changing of detection levels, the detection levels may be changed in accordance with constellation points of a transmitting system.

The changing of detection levels may include: calculating initial soft-decision values for first and second bits by using the I channel value and the Q channel value of the received signal; and changing the detection levels corresponding to an i-th lowest power level by using $\alpha_i$.

Another exemplary embodiment of the present invention provides a digital demodulation system including: a receiver that calculates an I channel value and a Q channel value of a received signal; a detection level calculator that changes detection levels to obtain non-uniform detection levels; and a demodulator that demodulates the received signal bit by bit by using the I channel value and the Q channel value calculated by the receiver and the detection levels changed by the detection level calculator.

The detection level calculator may change the detection levels in accordance with constellation points of a transmitting system.

The detection level calculator may calculate initial soft-decision values for first and second bits by using the I channel value and the Q channel value of the received signal, and change the detection levels corresponding to an i-th lowest power level by using $\alpha_i$.

According to an embodiment of the present invention, the performance of a receiver can be improved by using non-uniform detection levels, compared to a receiver with uniform detection levels.

By adjusting detection levels at a receiving system, performance improvement can be achieved for a system with a modulation order such as 8-VSB, 16-QAM 8-APSK, 8-PSK, or higher that uses non-uniform constellations, and detection and reception performance can also be increased for a system that does not use non-uniform constellations.

DETAILED DESCRIPTION OF THE EMBODIMENTS

Figure 1:
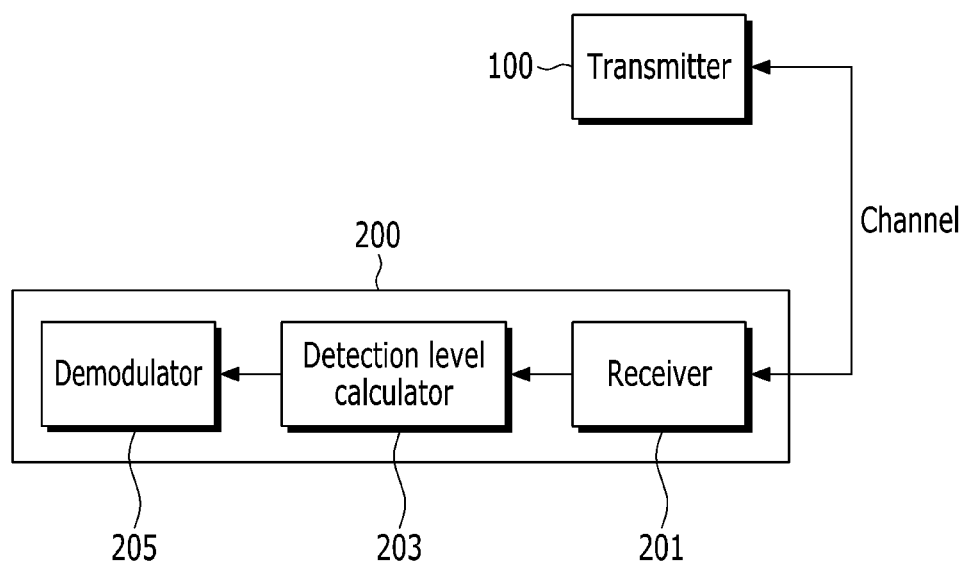
FIG. 1 is a block diagram of a digital demodulation system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A digital modulation system and method according to an exemplary embodiment of the present invention will now be described in detail with reference to the drawings.

FIG. 1 is a block diagram of a digital demodulation system according to an exemplary embodiment of the present invention.

Referring to FIG. 1, a transmitter 100 is a transmitting system, and a signal transmitted by the transmitter 100 is transmitted through an I channel and Q channel.

A digital demodulation system 200 is a system that is backward compatible and has non-uniform detection levels, and includes a receiver 201, a detection level calculator 203, and a demodulator 205.

The receiver 201 receives the signal sent by the transmitter 100 through the I channel and the Q channel. The detection level calculator 203 determines the value of a detection level. In this instance, the detection level calculator 203 changes the detection level. The demodulator 205 demodulates a received signal bit by bit based on the value of the detection level that is changed by the detection level calculator 203.

Figure 2:
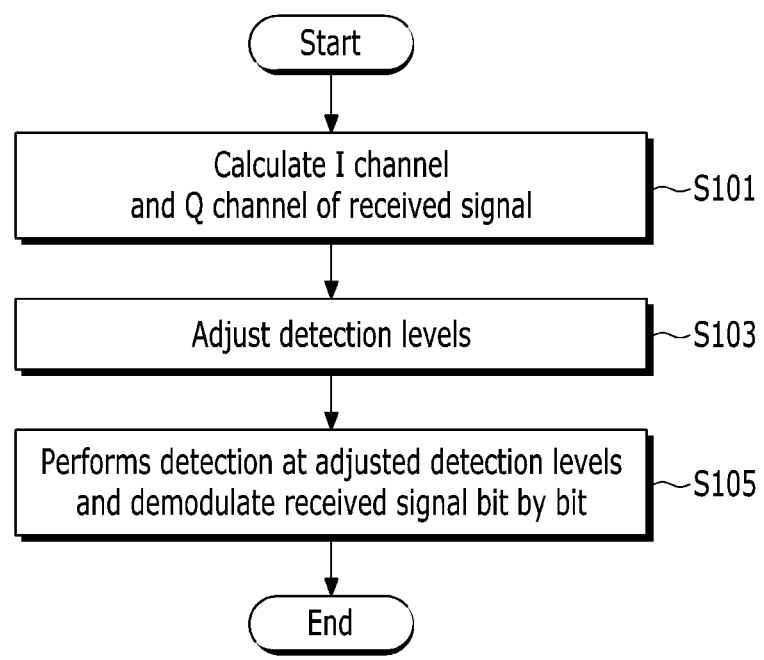
FIG. 2 is a flowchart showing an operation of the digital modulation system according to the exemplary embodiment of the present invention.
Figure 3:
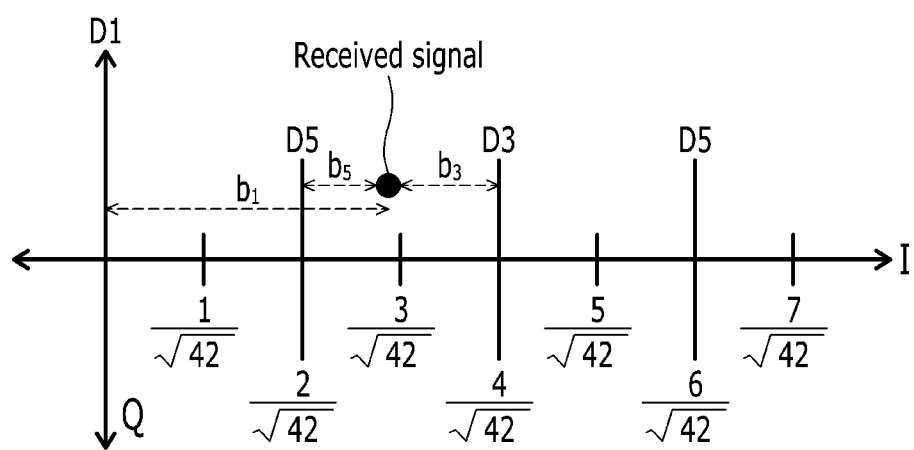
FIG. 3 is a diagram showing the structure of detection levels at an I channel for 64-QAM with uniform detection levels.
Figure 4:
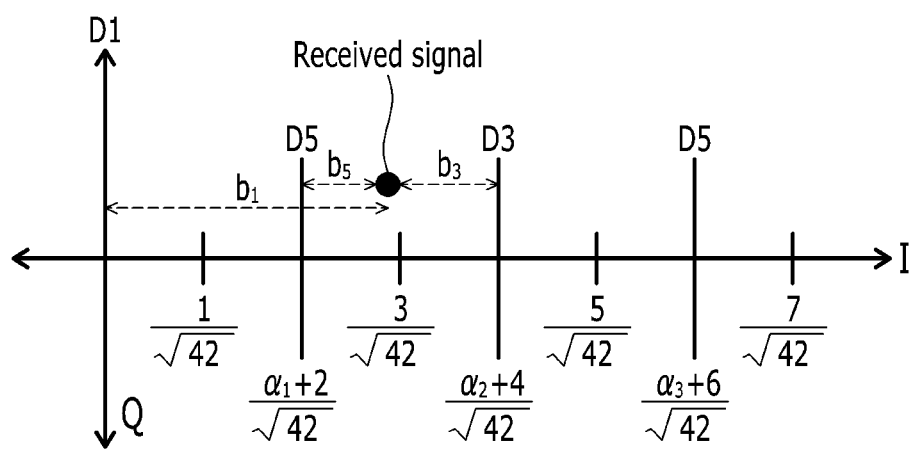
FIG. 4 is a diagram showing the structure of non-uniform detection levels according to the exemplary embodiment of the present invention.
Figure 5:
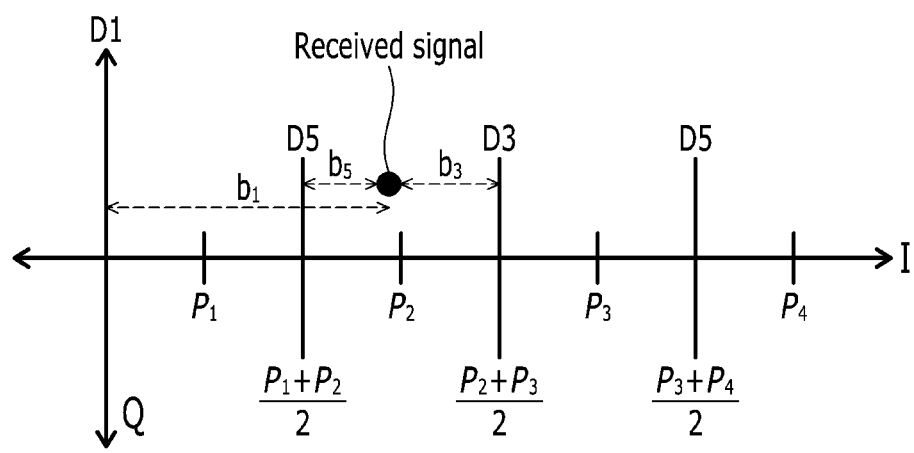
FIG. 5 is a diagram showing detection levels changing with non-uniform constellation points according to the exemplary embodiment of the present invention.
Figure 6:
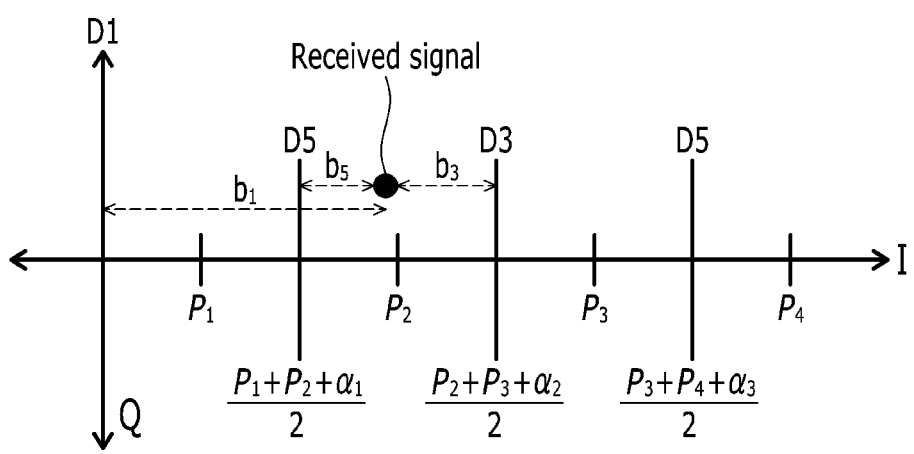
FIG. 6 is a diagram showing the adjustment of the detection levels changing with non-uniform constellation points according to the exemplary embodiment of the present invention.

FIG. 2 is a flowchart showing an operation of the digital modulation system according to the exemplary embodiment of the present invention, FIG. 3 is a diagram showing the structure of detection levels at an I channel for 64-QAM with uniform detection levels, FIG. 4 is a diagram showing the structure of non-uniform detection levels according to the exemplary embodiment of the present invention, FIG. 5 is a diagram showing detection levels changing with non-uniform constellation points according to the exemplary embodiment of the present invention, and FIG. 6 is a diagram showing the adjustment of the detection levels changing with non-uniform constellation points according to the exemplary embodiment of the present invention.

First, referring to FIG. 2, the receiver 201 calculates the I channel value and the Q channel value of a received signal (S101). The calculation of the I channel value and the Q channel value is done for the purpose of detection level adjustment.

Next, the detection level calculator 203 adjusts detection levels (S103).

Then, the demodulator 205 performs detection at the detection levels adjusted in S103, and demodulates a received signal bit by bit (S105).

Hereupon, the receiver 201 calculates initial soft decision values for first and second bits. The initial soft decision values are calculated according to $b_1=\text{Re}\{s\}$ and $b_2=\text{Im}\{s\}$, respectively, by using the I channel value and the Q channel value of the received signal s.

Based on the amplitude of the received signal, the received signal is demodulated bit by bit. A demodulation system with uniform constellations is as shown in FIG. 3. FIG. 3 shows the structure of detection levels at an I channel for 64-QAM with uniform detection levels.

In FIG. 3, $D_i$ is a detection level for an i-th bit. $b_i$ is a soft decision value for the i-th bit. The soft decision value for each bit is determined by the distance between its detection level and an adjacent detection level.

Referring to FIG. 3, the detection levels are evenly spaced. On the other hand, according to the exemplary embodiment of the present invention, the detection levels are non-uniformly adjusted by using particular values as shown in FIG. 4.

Referring to FIG. 4, $D_1$ is the same as in the system with uniform detection levels, and the detection levels corresponding to the i-th lowest power level are changed by using $\alpha_i$. The performance of the receiving system, i.e., the digital demodulation system 200, is determined according to the degree of change of each detection level.

$\alpha_i$ refers to the value of the detection level for the i-th bit, and the value of $\alpha_i$ is determined by repeated tests.

As the value of $\alpha_i$ varies depending on the transmitting/receiving system, $\alpha_i$ is not fixed to a certain value.

The second, fourth, and sixth bits associated with the Q channel value are detected in the same manner as above.

In a system using non-uniform constellations, detection levels need to be changed in accordance with non-uniform constellation points, as shown in FIG. 5.

Referring to FIG. 5, $P_1$ is the lowest constellation point, and $P_i$ is the i-th constellation point obtained by an increase.

In a system using uniform constellations, detection levels are evenly spaced. For a demodulation system with non-uniform constellations, on the other hand, the detection levels need to be changed in accordance with constellation points, as shown in FIG. 5.

Moreover, reception performance can be improved by using $\alpha_i$, as shown in FIG. 6.

Although FIG. 3, FIG. 4, FIG. 5, and FIG. 6 illustrate examples for 64-QAM, the exemplary embodiment of the present invention is not limited to 64-QAM. Although $\alpha_i$ is added to detection levels for non-uniformity, multiplication or other mathematical operations can be performed.

Detection is then performed at the detection levels adjusted in FIG. 3, FIG. 4, FIG. 5, and FIG. 6, and the received signal is demodulated bit by bit.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A digital demodulation method for a digital demodulation system that demodulates a received signal, the method comprising:
    calculating an in-phase (I) channel value and a quadrature (Q) channel value of the received signal;
    changing detection levels of a transmitting/receiving system that incorporates the digital demodulation system to obtain non-uniform detection levels; and
    demodulating the received signal bit by bit by using the changed non-uniform detection levels, the I channel value, and the Q channel value,
    wherein the changing of detection levels comprises:
    calculating initial soft-decision values for first and second bits by using the I channel value and the Q channel value of the received signal; and
    changing the detection levels of the transmitting/receiving system that incorporates the digital demodulation system, the detection levels corresponding to an i-th lowest power level by using a detection level value ($\alpha_i$) for an i-th bit determined by repeated tests of the transmitting/receiving system.

2. The method of claim 1, wherein, in the changing of detection levels, the detection levels are changed in accordance with constellation points of a transmitting system.

3. A digital demodulation system comprising:
    a receiver that calculates an in-phase (I) channel value and a quadrature (Q) channel value of a received signal;
    a detection level calculator that changes detection levels of a transmitting/receiving system that incorporates the digital demodulation system to obtain non-uniform detection levels;
    a demodulator that demodulates the received signal bit by bit by using the I channel value and the Q channel value calculated by the receiver and the non-uniform detection levels changed by the detection level calculator,
    wherein the detection level calculator calculates initial soft-decision values for first and second bits by using the I channel value and the Q channel value of the received signal, and changes the detection levels of the transmitting/receiving system that incorporates the digital demodulation system, the detection levels corresponding to an i-th lowest power level by using a detection level value ($\alpha_i$) for an i-th bit determined by repeated tests of the transmitting/receiving system.

4. The system of claim 3, wherein the detection level calculator changes the detection levels in accordance with constellation points of a transmitting system.

* * * * *